US011283639B2

(12) United States Patent
Nandy et al.

(10) Patent No.: US 11,283,639 B2
(45) Date of Patent: Mar. 22, 2022

(54) MULTICAST FLOW ANOMALY IDENTIFICATION

(71) Applicant: HEWLETT PACKARD ENTERPRISE DEVELOPMENT LP, Houston, TX (US)

(72) Inventors: Tathagata Nandy, Bangalore (IN); Chethan Chavadibagilu Radhakrishna Bhat, Bangalore (IN); Utkarsh Srivastava, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/807,645

(22) Filed: Mar. 3, 2020

(65) Prior Publication Data
US 2020/0287734 A1 Sep. 10, 2020

(51) Int. Cl.
| | | |
|---|---|---|
| *H04L 12/18* | (2006.01) | |
| *H04L 45/58* | (2022.01) | |
| *H04L 45/24* | (2022.01) | |
| *H04L 47/2441* | (2022.01) | |
| *H04L 45/02* | (2022.01) | |
| H04L 29/06 | (2006.01) | |

(52) U.S. Cl.
CPC ........ *H04L 12/185* (2013.01); *H04L 12/1863* (2013.01); *H04L 45/02* (2013.01); *H04L 45/24* (2013.01); *H04L 45/58* (2013.01); *H04L 47/2441* (2013.01); H04L 63/1425 (2013.01)

(58) Field of Classification Search
CPC ... H04L 12/185; H04L 12/1863; H04L 45/58; H04L 45/24; H04L 45/02; H04L 45/28; H04L 45/16
See application file for complete search history.

(56) References Cited

U.S. PATENT DOCUMENTS

| | | | |
|---|---|---|---|
| 7,760,668 B1 * | 7/2010 | Zinjuvadia | H04L 45/02 370/256 |
| 8,442,047 B2 | 5/2013 | Pan | |
| 8,780,908 B2 | 7/2014 | Mentze et al. | |
| 9,432,204 B2 | 8/2016 | Shen et al. | |
| 10,313,229 B2 * | 6/2019 | Modi | H04L 49/252 |
| 2007/0025258 A1 * | 2/2007 | Chen | H04L 47/10 370/241 |

(Continued)

OTHER PUBLICATIONS

Behringer et al., "Using Only Link-Local Addressing inside an IPv6 Network", Internet Engineering Task Force, RFC 7404, Nov. 2014, pp. 1-10.

(Continued)

*Primary Examiner* — Min Jung
(74) *Attorney, Agent, or Firm* — Rathe Lindenbaum LLP (57) ABSTRACT

An example system includes a network having interconnected routers, a multicast source to transmit data through the network for receipt by receiving host devices, and a query agent communicatively coupled to each router of the interconnected routers. The query agent is to generate a flow tree for multicasting of the data from the multicast source to each receiving host device, the flow tree including flow paths from the multicast source to each receiving host device, query each router to determine a status of at least one flow path of the flow tree, and identify an anomaly associated with at least one router in the at least one flow path.

15 Claims, 5 Drawing Sheets

(56) References Cited

U.S. PATENT DOCUMENTS

| | | | | |
|---|---|---|---|---|
| 2008/0056254 | A1* | 3/2008 | Sridhar | H04L 43/0811 370/390 |
| 2008/0175172 | A1* | 7/2008 | Nishi | H04L 45/48 370/256 |
| 2009/0232007 | A1* | 9/2009 | Field | H04L 43/0823 370/242 |
| 2010/0153316 | A1* | 6/2010 | Duffield | H04L 63/1416 706/12 |
| 2012/0155277 | A1* | 6/2012 | Jain | H04L 12/1863 370/241 |
| 2014/0304554 | A1* | 10/2014 | Dorfner | H04L 41/0813 714/43 |
| 2015/0146575 | A1* | 5/2015 | Singh | H04L 45/16 370/256 |
| 2018/0351791 | A1* | 12/2018 | Nagarajan | H04L 41/08 |
| 2019/0081884 | A1* | 3/2019 | Spohn | H04L 45/124 |
| 2020/0120020 | A1* | 4/2020 | Dutta | H04L 12/66 |

OTHER PUBLICATIONS

Cain et al., "Internet Group Management Protocol," Network Working Group, RFC 3376, Version 3, Oct. 2002, pp. 1-53.

Fenner et al., "Protocol Independent Multicast—Sparse Mode (PIM-SM): Protocol Specification (Revised)", Network Working Group, RFC 4601, Aug. 2006, pp. 1-112.

W. Fenner, "Internet Group Management Protocol", Network Working Group, RFC 2236, version 3, Nov. 1997, pp. 1-24.

Asaeda, H. et al., "Mtrace Version 2: Traceroute Facility for IP Multicast," Oct. 2014, 23 pages, https://www.hjp.at/doc/rfc/rfc8487.html.

Kotani, D. et al., "A Multicast Tree Management Method Supporting Fast Failure Recovery and Dynamic Group Membership Changes in OpenFlow Networks," Mar. 2016, pp. 395-406, https://www.jstage.jst.go.jp/article/ipsjjip/24/2/24_395/_pdf.

Lapukhov, P., "Troubleshooting Multicast Routing," Sep. 17, 2010, 14 pages, https://blog.ine.com/2010/09/17/troubleshooting-multicast-routing.

Raja, V. et al., "An Openflow-Based Approach to Failure Detection and Protection for a Multicasting Tree," May 2015, 15 pages, https://link.springer.com/chapter/10.1007/978-3-319-22572-2_15.

* cited by examiner

MULTICAST FLOW ANOMALY IDENTIFICATION

BACKGROUND

Multicasting allows simultaneous delivery of data over a network from a multicast source to any number of receiving hosts. Using routing protocols, multicasting transmits the data to the various receiving hosts through any number of routers, or switches, in a network.

BRIEF DESCRIPTION OF THE DRAWINGS

For a more complete understanding of various examples, reference is now made to the following description taken in connection with the accompanying drawings in which.

DETAILED DESCRIPTION

As noted above, multicasting transmits the data to the various receiving hosts through any number of router in a network. In this regard, the routers in the network may be configured to receive and transmit data (e.g., packets) based on information in the packets, as well as configuring of connections of the routers. The routing of multicast data from the multicast source to the various receiving hosts through the network may be configured manually by, for example, network administrators, or implemented on each node in the network to enable automatic creation of multicast distribution trees. Due to the complex nature of such networks, identification of an anomaly in a multicast flow path. Such anomalies may occur for a variety of reasons, such as an error in the configuration of a router, for example.

Various examples described herein relate to identification of an anomaly at a router in a multicast flow. In various examples, a query agent, which may be implemented in a host device coupled to a network, generates a flow tree for a multicast from a multicast source to various receiving host devices. The flow tree includes various flows from the multicast source to each receiving host device through routers forming the network. In some examples, generation of the flow tree may include requesting the (Source, Group) state at each router to identify each flow in the multicast. The query agent sends a query to each router in a selected flow of the multicast. The query may request data from any of a variety of tables at each router, the data being associated with the selected flow through each router. The query agent may identify an anomaly at least at one router in the selected flow based on receipt of the requested data. In some examples, the data may indicate the root/leaf relationship between two routers and indicate a mismatch. For example, the query agent may determine that the anomaly is due to an error in the unicast configuration of a particular router, leading to the missing flow of multicast data. Based on identification of the anomaly, the query agent may cause a solution to the anomaly to be applied. For example, a corrective configuration may be applied to a mis-configured router.

Figure 1:
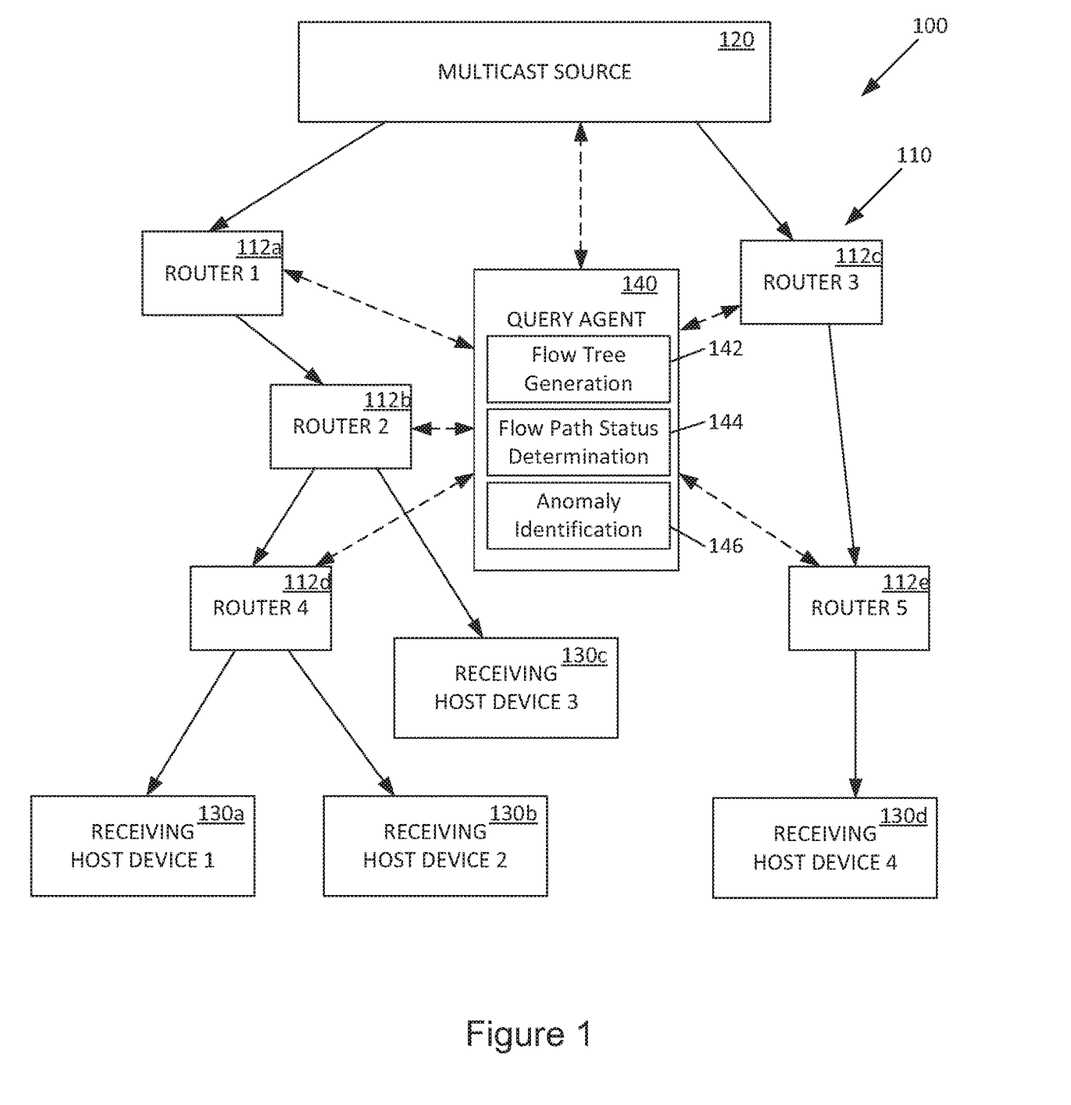
FIG. 1 illustrates an example system for anomaly identification in a multicast flow.

Referring now to FIG. 1, an example system for anomaly identification in a multicast flow is illustrated. The example system 100 of FIG. 1 includes a network 110 which formed with various interconnected routers 112a-e. The network 110 of the example system 100 may be a public network, such as the Internet, or a private network. The various routers 112a-e, also referred to as switches, may be provided to route data (e.g., packets of data) through the network from one host device to another. The routers 112a-e may operate in accordance with any of a variety of protocols, such as Internet Group Management Protocol (IGMP) or Protocol Independent Multicast (PIM), for example. Further, the example system 100 of FIG. 1 is illustrated with five routers 112a-e. Various networks may include any number of routers depending on the size of the network 110.

In the example system 100 of FIG. 1, a multicast source 120 is provided to transmit data through the network 110. Multicasting of data from the multicast source 120 allows simultaneous receipt of the data by a plurality of receiving host devices 130a-d. The multicast source 120 may include a content server for streaming of data, for example. In various examples, the multicast source 120 may include multiple servers that may be distributed throughout the network 110.

The receiving host devices 130a-d may be any types of communication devices connected to the network. For example, the receiving host devices 130a-d may include desktop terminals, laptops or mobile devices. The example system 100 of FIG. 1 is illustrated with four receiving host devices 130a-d. Various example systems may include any number of receiving host devices.

The example system 100 of FIG. 1 further includes a query agent 140 communicatively coupled to each router of the interconnected routers 112a-e. The communication between the query agent 140 and the various routers 112a-e may itself use the network 110. Thus, while FIG. 1 illustrates coupling of the query agent 140 to each router by the dashed lines, the communication between the query agent 140 and a particular router may be routed through other routers using Internet Protocol (IP) communication.

The query agent 140 may be implemented on a server or another communication device connected to the network 110. Various aspects of the query agent 140 described herein may be implemented as hardware, software, firmware or a combination thereof. The query agent 140 may be accessible by a network administrator or another authority. In one example, the query agent 140 may be accessible by a network administrator associated with the multicast source 120.

In the example system 100 of FIG. 1, the query agent 140 includes a flow tree generation portion 142 to generate a flow tree for multicasting of the data from the multicast source 120 to each receiving host device 130a-d. The flow tree includes flow paths from the multicast source 120 to each receiving host device 130a-d. For example, the flow tree includes the flow path from the multicast source 120 to Receiving Host Device 1 130a as (Source 120→Router 1 112a→Router 2 112b→Router 4 112d→Receiving Host Device 1 130a). The flow tree includes similar flow paths for routing of the data from the multicast source 120 to the other receiving host devices 130b-d. In various examples, the flow tree may be generated by querying the state-group (S, G) information for each router 112a-e for the multicast flow. In some examples, the query agent 140 may be provided with, or be able to obtain, the topology of the network. In this regard, the query agent 140 may have the arrangement and connections of the various routers 112a-e in the network prior to generation of the flow tree for the particular multicast. Thus, the query agent 140 may be centralized network management tool with knowledge of the topology of the network 110.

Figure 2:
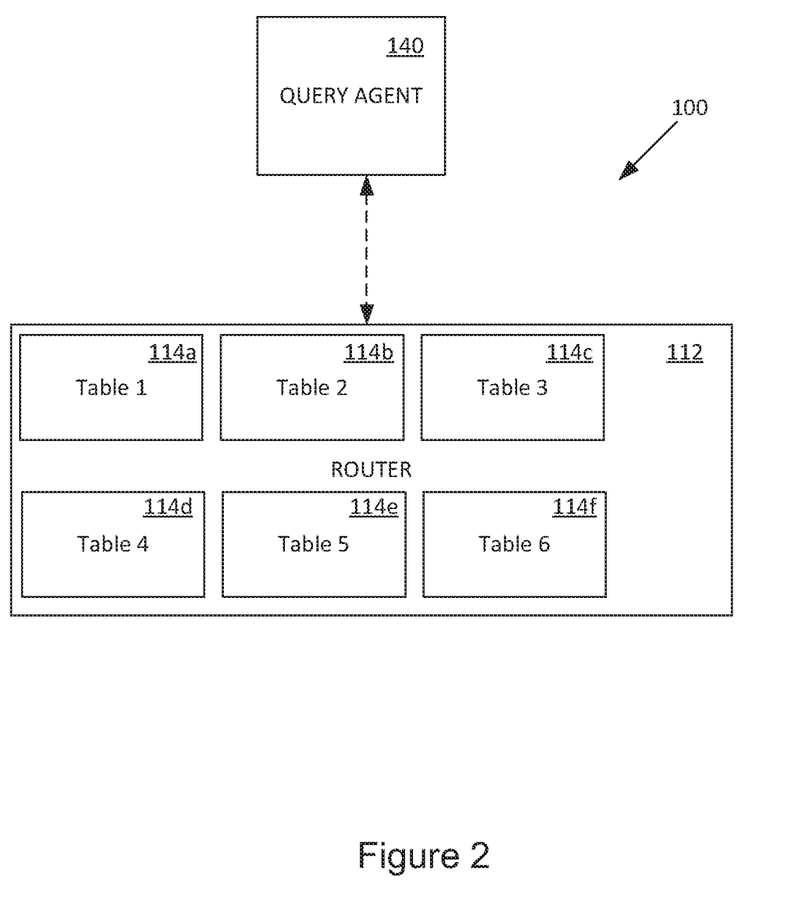
FIG. 2 illustrates a portion of the example system of FIG. 1 illustrating the query agent and an example router.

The query agent 140 further includes a flow path status portion 144 to query each router 112a-e to determine a status of at least one flow path of the flow tree. In this regard, the query agent 140 may query various tables in each router to obtain information related to the specific multicast. For example, as illustrated in FIG. 2, the query agent 140 may query any of a variety of tables 114a-f of a router 112. One or more of the tables 114a-f may be tables which can be read from outside the router 112 without any modifications to the router 112. The tables 114a-f may include, for example, Open vSwitch Database (OVSDB) management protocol tables, Internet Group Management Protocol (IGMP) database tables, Mrouter tables, hardware tables, or unicast routing tables. In various examples, IGMP database tables may be indexed by virtual local area network (VLAN), group, or source. Various Mrouter tables may include information related to incoming and outgoing interfaces for a group and source.

Each flow path in the flow tree of the multicast may be queried at each relevant router 112a-e of the network 110 illustrated in FIG. 1. In this regard, the query agent 140 may query the tables of each router to, for example, determine a leaf router or node for a flow path. The leaf may then be queried to determine whether the multicast data is received by the leaf or the receiving host device 130a-d. The status of the flow path at each router may thus be determined as matching the expected state based on the generated flow tree or not matching the expected state. For example, if the multicast data is not received at the leaf router or node, the status is determined as not matching.

Thus, in accordance with the present disclosure, each router 112a-e in a flow path or in the flow tree of the multicast is queried directly by the query agent 140. In this regard, the need for any additional software, hardware or other modifications to the routers 112a-e is avoided. Further, the query agent 140 is not reliant upon queries submitted by other entities, such as an intermediate router, to obtain the status of the flow at each router.

The query agent 140 further includes an anomaly identification portion 144 to identify an anomaly associated with at least one router in the at least one flow path. In this regard, the query agent may identify an anomaly at a particular router indicating an anomalous flow state.

The identification of the anomaly may be achieved by performing further queries or analysis of information from the various tables 114a-f of a router 112, as illustrated in FIG. 2. For example, one table may be associated with IGMP database. The IGMP database may be queried to see if the data is received by the host. In the event that the data is not received, then IGMP issues may be suspected. To identify the anomaly, the query agent 140 may perform further queries of tables related to Layer 2 or IGMP. In some cases, the anomaly may be identified as incorrect programming of the unicast routing at the router. For example, the unicast routing programming of the router may be inconsistent with the network topology at the router.

In one example, based on the queries described above, a termination point of a flow path may be identified by the query agent 140. For example, a downstream router in the flow path may be determined to not receive the multicast data packet from the immediately upstream router. In such cases, the query agent 140 may send a trap query to the router or a network controller, such as a centralized software-defined network (SDN) controller or a network management system (NMS) device for the network 110. The trap query may include identification of the flow path, an interface of the router, the multicast group and source, identification of the upstream router and the flow activity status at the downstream router, where the upstream router indicates data being forwarded to the downstream router. The query agent may query the status of the problematic flow in the upstream router via Simple Network Management Protocol (SNMP) or Representational State Transfer (REST) interfaces. The status of the flow is compared to further upstream devices to further identify the issue or cause of the anomaly. For example, if the traffic is stopped, further queries may determine whether the further upstream device has an issue or if the source has stopped sending traffic to all routers. In either case, the anomaly may be identified and a solution may be proposed or implemented.

In various examples, the query agent 140 may find and/or implement a solution based on the identified anomaly. In this regard, the query agent may cause rectification of the anomaly by, for example, updating a database associated with the flow to reflect the anomaly, reconfiguring unicast routing at the router, or disabling an interface that is associated with the anomaly of the router. For example, if the query agent 140 determines that a flow entry is missing for a flow, but a database at the router includes the flow, then the flow may be deleted and re-created in the database. The deletion may cause a fresh trigger of the flow If only a particular flow is missing from a router, the anomaly may be associated with the unicast programming of the router. In this case, the routing for the router may be reprogrammed so that the missing flow can be handled. If the flow is missing at a particular interface of the router, then the interface may be disabled or re-started.

Figure 3:
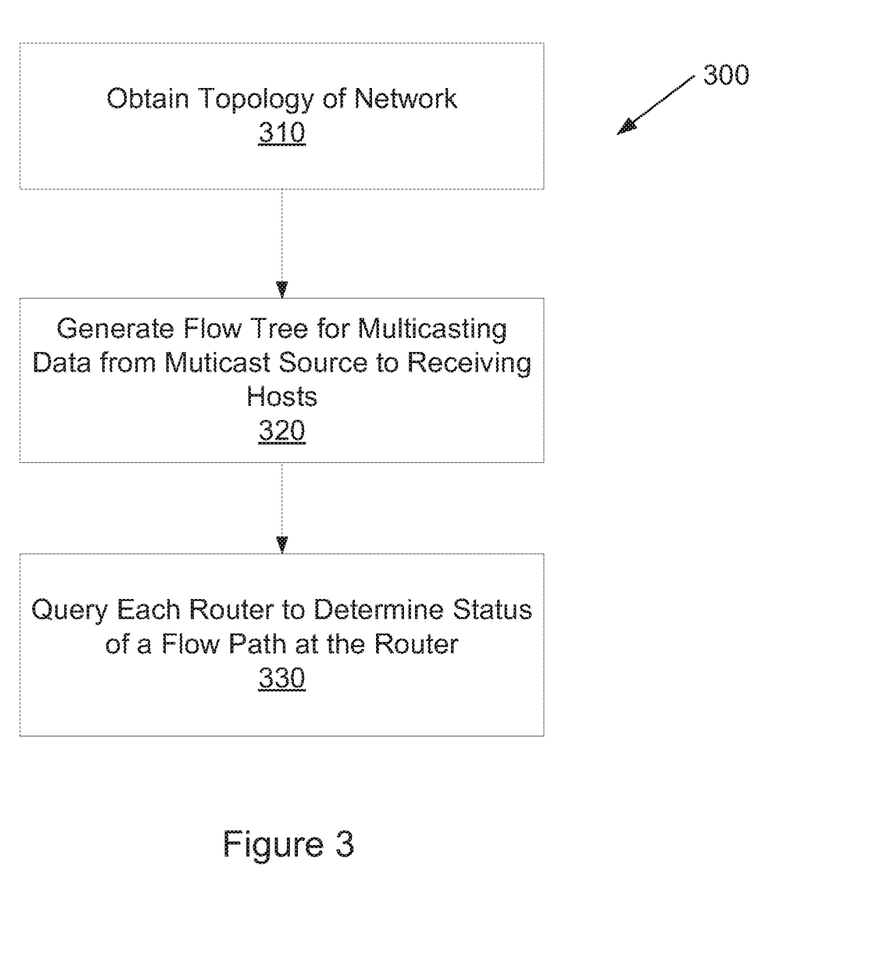
FIG. 3 is a flow chart illustrating an example method for anomaly identification in a multicast flow.

FIG. 3 is a flow chart illustrating an example method for anomaly identification in a multicast flow. The example method 300 may be implemented in, for example the query agent 140 of the example system 100 described above with reference to FIG. 1. The example method 300 includes obtaining a topology of a network, the network including interconnected routers (block 310). As noted above, the query agent 140 obtain the arrangement and connections of the various routers 112a-e in the network prior to generation of the flow tree for the particular multicast. In this regard, the query agent 140 may query each router in the network, possibly including those routers which are not involved in the specific multicast, to determine the various connections of each router in the network.

The example method 300 of FIG. 3 further includes generating a flow tree for multicasting of data from a multicast source to receiving host devices (block 320). The flow tree includes flow paths from the multicast source to each receiving host device. For example, with reference to FIG. 1 described above, the flow tree includes flow paths for routing of the data from the multicast source 120 to the various receiving host devices 130a-d. In various examples, the flow tree may be generated by querying the state-group (S, G) information for each router 112a-e for the multicast flow.

The example method 300 further includes querying each router of the interconnected routers to determine a status of at least one flow path of the flow tree at the respective router (block 330). As described above with reference to FIGS. 1 and 2, the query agent 140 may query various tables 114a-f in each router to obtain information related to the specific multicast. Each flow path in the flow tree of the multicast may be queried at each relevant router 112a-e of the network 110 illustrated in FIG. 1. The status of the flow path at each router may be determined as matching the expected state based on the generated flow tree or not matching the expected state. For example, if the multicast data is not received at the leaf router or node, the status is determined as not matching.

Figure 4:
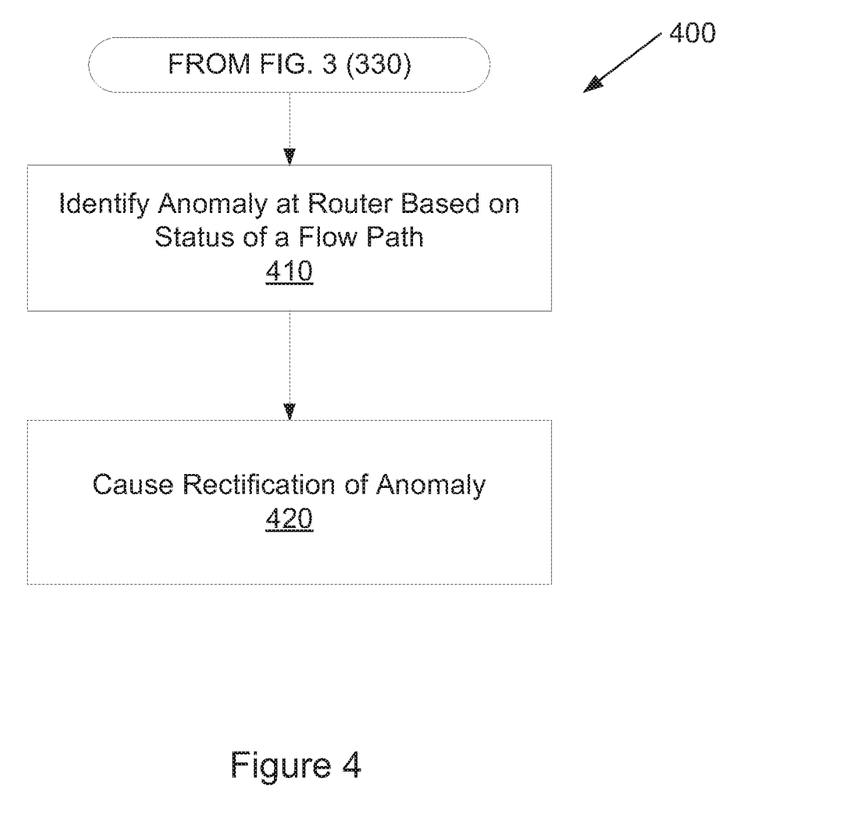
FIG. 4 is a flow chart illustrating an example method for anomaly rectification.

Referring now to FIG. 4, a flow chart illustrates an example method 400 for anomaly rectification in a multicast flow path. In various examples, the example method 400 may follow the determination of the status of a flow path at a router, as described above with reference to block 330 of the example method 300 of FIG. 3. The example method 400 of FIG. 4 includes identifying an anomaly at the respective router based on the status of the at least one flow path (block 410). In this regard, the query agent 140 may identify an anomaly at a particular router indicating an anomalous flow state. As described above with reference to FIGS. 1 and 2, the identification of the anomaly may be achieved by performing further queries or analysis of information from the various tables 114a-f of a router 112. For example, the anomaly may be identified as incorrect programming of the unicast routing at the router if the unicast routing programming of the router may be inconsistent with the network topology at the router.

The example method 400 further includes causing rectification of the anomaly (block 420. In various example, the rectification of the anomaly may include at least one of updating a database associated with the flow to reflect the anomaly, reconfiguring unicast routing at the router, or disabling an interface of the router, the interface being associated with the anomaly. As described above with reference to FIG. 1, the query agent 140 may find and/or implement a solution based on the identified anomaly.

Figure 5:
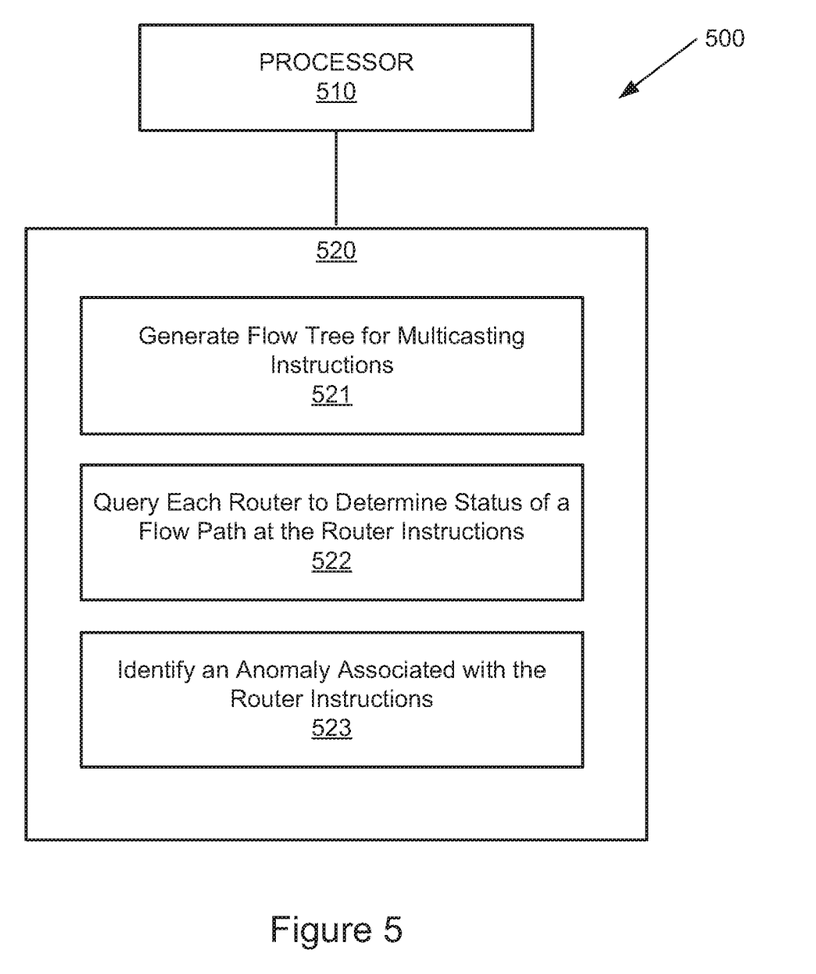
FIG. 5 illustrates a block diagram of an example system with a computer-readable storage medium including instructions executable by a processor for anomaly detection in a multicast flow.

Referring now to FIG. 5, a block diagram of an example system 500 is illustrated with a computer-readable storage medium including instructions executable by a processor for anomaly detection in a multicast flow. The system 500 includes a processor 510 and a non-transitory computer-readable storage medium 520. The computer-readable storage medium 520 includes example instructions 521-523 executable by the processor 510 to perform various functionalities described herein. In various examples, the non-transitory computer-readable storage medium 520 may be any of a variety of storage devices including, but not limited to, a random access memory (RAM) a dynamic RAM (DRAM), static RAM (SRAM), flash memory, read-only memory (ROM), programmable ROM (PROM), electrically erasable PROM (EEPROM), or the like. In various examples, the processor 510 may be a general purpose processor, special purpose logic, or the like. In various examples, the processor 510 may include or be included in the query agent 140 of the example system 100 described above with reference to FIG. 1.

The example instructions include generate a flow tree for multicasting instructions 521. In various examples, the flow tree may be generated for multicasting of data from a multicast source to receiving host devices in a network including interconnected routers, the flow tree including flow paths from the multicast source to each receiving host device. For example, with reference to FIG. 1 described above, the flow tree includes flow paths for routing of the data from the multicast source 120 to the various receiving host devices 130a-d. In various examples, the flow tree may be generated by querying the state-group (S, G) information for each router 112a-e for the multicast flow.

The example instructions further include query each router of the interconnected routers to determine a status of at least one flow path of the flow tree at the respective router instructions 522. As described above with reference to FIGS. 1 and 2, the query agent 140 may query various tables 114a-f in each router to obtain information related to the specific multicast. Each flow path in the flow tree of the multicast may be queried at each relevant router 112a-e of the network 110 illustrated in FIG. 1. The status of the flow path at each router may be determined as matching the expected state based on the generated flow tree or not matching the expected state. For example, if the multicast data is not received at the leaf router or node, the status is determined as not matching.

The example instructions further include identify an anomaly associated with the respective router in the at least one flow path 523. As described above with reference to FIGS. 1 and 2, the identification of the anomaly may be achieved by performing further queries or analysis of information from the various tables I 14a-f of a router 112. For example, the anomaly may be identified as incorrect programming of the unicast routing at the router if the unicast routing programming of the router may be inconsistent with the network topology at the router.

Thus, in various examples, a centralized networking tool, such as the query agent described above, may be provided to identify an anomaly in a flow path of a multicast flow tree. Each router in a flow path or in a flow tree of a multicast is queried directly by the query agent. The anomaly identification is thus achieved without any modifications to the routers. Further, solutions to rectify the anomaly may be implemented in an efficient manner.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

We claim:
1. A system, comprising:
a network having interconnected routers;
   a multicast source to transmit data through the network for receipt by receiving host devices; and a first query agent communicatively coupled to each router of the interconnected routers, the first query agent being to:
generate a flow tree for multicasting of the data from the multicast source to each receiving host device, the flow tree including flow paths from the multicast source to each receiving host device;
query different database tables at each router to determine a status of at least one flow path of the flow tree wherein the status indicates whether an expected state at the router is satisfied, and wherein the expected state indicates that the data is received at the router;
identify, based on the determined status, an anomaly associated with at least one router in the at least one flow path with the anomaly indicating that the expected state at the router is not satisfied; and
in response to identifying the anomaly, rectify the anomaly by at least updating a database table at the router.

2. The system of claim 1, wherein the first query agent is to generate the flow tree by obtaining flow information from each router in the network.

3. The system of claim 2, wherein the flow information includes an expected state at each router.

4. The system of claim 1, wherein the first query agent is to determine the status of the at least one flow path by querying information from at least one table at a router.

5. The system of claim 4, wherein the first query agent is to identify the anomaly based on the determination of the status indicating an anomalous flow state.

6. The system of claim 1, wherein the first query agent is further to:
cause rectification of the anomaly by at least one of:
updating the database table associated with the flow to reflect the anomaly;
reconfiguring unicast routing at the router; or
disabling an interface of the router, the interface being associated with the anomaly.

7. The system of claim 1, wherein the first query agent is further to:
obtain a topology of the network prior to generating the flow tree.

8. A method, comprising:
obtaining a topology of a network, the network including interconnected routers;
generating a flow tree for multicasting of data from a multicast source to receiving host devices, the flow tree including flow paths from the multicast source to each receiving host device;
querying different database tables at each router of the interconnected routers to determine a status of at least one flow path of the flow tree at the respective router, wherein the status indicates whether an expected state at the router is satisfied, and wherein the expected state indicates that the data is received at the router; and
in response to identifying an anomaly based on the determined status, rectifying the anomaly by at least updating a database table at the router.

9. The method of claim 8, wherein generating the flow tree includes obtaining flow information from each router in the network.

10. The method of claim 9, wherein the flow information includes tan expected state at each router.

11. The method of claim 8, wherein the status of the at least one flow path is determined by querying information from at least one table at a router.

12. The method of claim 8, further comprising:
identifying, based on the determined status, an anomaly at the respective router based on the status of the at least one flow path with the anomaly indicating that the expected state at the router is not satisfied.

13. The method of claim 12, further comprising:
causing rectification of the anomaly by at least one of:
updating the database table associated with the flow to reflect the anomaly;
reconfiguring unicast routing at the router; or
disabling an interface of the router, the interface being associated with the anomaly.

14. A non-transitory computer-readable storage medium encoded with instructions executable by a processor of a computing system, the computer-readable storage medium comprising instructions to:
generate a flow tree for multicasting of data from a multicast source to receiving host devices in a network including interconnected routers, the flow tree including flow paths from the multicast source to each receiving host device;
query different database tables at each router of the interconnected routers to determine a status of at least one flow path of the flow tree at the respective router, wherein the status indicates whether an expected state at the router is satisfied, and wherein the expected state indicates that the data is received at the router;
identify, based on the determined status, an anomaly associated with the respective router in the at least one flow path with the anomaly indicating that the expected state at the router is not satisfied; and
in response to identifying the anomaly, rectify the anomaly by at least updating a database table at the router.

15. The non-transitory computer-readable storage medium of claim 14, comprising instructions to:
cause rectification of the anomaly by at least one of:
updating the database table associated with the flow to reflect the anomaly;
reconfiguring unicast routing at the router; or
disabling an interface of the router, the interface being associated with the anomaly.

* * * * *